United States Patent
Van Ryzin et al.

(10) Patent No.: US 8,776,519 B2
(45) Date of Patent: Jul. 15, 2014

(54) OCEAN THERMAL POWER SYSTEM

(75) Inventors: Joe Van Ryzin, Kailua, HI (US); Steven Rizea, Orlando, FL (US)

(73) Assignee: Makai Ocean Engineering, Inc., Kailua, HI (US)

( * ) Notice: Subject to any disclaimer, the term of this patent is extended or adjusted under 35 U.S.C. 154(b) by 209 days.

(21) Appl. No.: 13/564,001

(22) Filed: Aug. 1, 2012

(65) Prior Publication Data
US 2013/0031903 A1      Feb. 7, 2013

Related U.S. Application Data

(60) Provisional application No. 61/514,385, filed on Aug. 2, 2011.

(51) Int. Cl.
F03G 7/04      (2006.01)
F01K 7/00      (2006.01)

(52) U.S. Cl.
USPC ................................ 60/641.7; 60/675

(58) Field of Classification Search
USPC ............... 60/398, 641.6, 641.7, 675; 417/52
See application file for complete search history.

(56) References Cited

U.S. PATENT DOCUMENTS

| | | | |
|---|---|---|---|
| 4,216,657 A | | 8/1980 | Ridgway |
| 4,245,475 A | * | 1/1981 | Girden .......................... 60/641.7 |
| 4,441,321 A | | 4/1984 | Ridgway |
| 4,603,553 A | * | 8/1986 | Ridgway ....................... 60/641.7 |
| 4,726,191 A | * | 2/1988 | Kawamura ................... 60/641.7 |

* cited by examiner

*Primary Examiner* — Hoang Nguyen
(74) *Attorney, Agent, or Firm* — The Marbury Law Group, PLLC

(57) ABSTRACT

The various embodiments provide a power-generating plant including a dynamic floating platform that is configured to efficiently produce 100 MW of power using a honeycomb configuration of mist lift cells. The mist lift columns are configured to optimize performance and to adjust configurations of components to compensate for changes in orientation of the platform and temperature of sea water in order to manage power output of the plant.

30 Claims, 12 Drawing Sheets

OCEAN THERMAL POWER SYSTEM

RELATED APPLICATIONS

This patent application claims the benefit of priority to U.S. Provisional Patent Application Ser. No. 61/514,385, entitled "Ocean Thermal Power System" filed on Aug. 2, 2011, the entire contents of which are hereby incorporated by reference.

FIELD

The present application relates to practical application and improvement of a mist lift open cycle ocean thermal energy conversion (OTEC) system.

BACKGROUND

Using the idea of a mist lift cycle to generate power differs in many aspects from traditional open cycle OTEC systems. In a mist lift system, the entire mass of seawater is used to generate electricity, rather than just the low density flash-evaporated vapor. This avoids the need for large, expensive water vapor turbines.

The concepts behind the standard mist lift technology, an alternative to traditional open cycle OTEC systems, is described in U.S. Pat. Nos. 4,441,321 and 4,216,657, the entire contents of which are hereby incorporated by reference for background on the technology. The mist lift cycle is designed to generate power using a fine mixture of water vapor and droplets at the bottom of a chamber, where the vapor is cooled and condensed at the upper portion of the chamber to create a lower pressure region. A rush of the water vapor toward the cooler and lower pressure area drags water droplets toward the top of the chamber. In this manner, mass is moved from the bottom to the top, driven by the temperature and pressure differential. Once the water is elevated, now condensed, it passes through a water turbine coupled to a generator to produce electricity.

Despite the benefits that the mist lift design provides over previous OTEC systems, the original implementation of mist lift left unsolved environmental and physical challenges. For example, variations in wave-induced motions can cause disturbances in the pitch and/or roll of a floating structure, and changes in surface seawater temperatures can affect the thermodynamics of the system. These are variables that could impact the ability of a mist lift system to efficiently generate power.

SUMMARY

The various embodiments provide a power-generating plant that uses mist lift cycles to efficiently produce at least 100 MW of power. The various embodiments provide a power-generating plant that may be a floating, off-shore platform that includes a plurality of cells, at least one water turbine housed in one or more of the plurality of cells of the platform, at least one cold water pipe housed in one or more of the plurality of cells of the platform, and at least one vacuum chamber housed in one or more of the plurality of cells of the platform. The plurality of platform cells may have a honeycomb configuration. In an embodiment power-generating plant, vacuum chambers may be maintained at a pressure lower than the pressure of surrounding seawater. In an embodiment, each vacuum chamber may include an intake screen positioned at the bottom of the vacuum chamber. In an embodiment, each vacuum chamber may also include a mist generator positioned above the intake screen, which is configured to cause the warm surface seawater to form a mist of warm water droplets and water vapor. In an embodiment, each vacuum chamber may also include one or more cold water injection nozzles configured to spray cold water into the vacuum chamber at a cold water injection point, which creates a pressure differential between the pressure of the mist and the lower pressure at the cold water injection point. In an embodiment, each vacuum chamber may also include an acceleration region between the mist generator and the cold water injection point, in which the water vapor lifts the warm water droplets and accelerates upward toward the cold water injection point. In an embodiment, each vacuum chamber may also include a condensing region between the cold water injection point and the top of the vacuum chamber, in which the cold water contacts the accelerated mist to form a mixed water jet and the water vapor is condensed as the mixed water jet travels upward. The momentum of the accelerated mist carries the mixed water jet upward until it reaches a stop point. In an embodiment, each vacuum chamber may also include a water catchment system for collecting the water from the mixed water jet, which may be configured to align with the stop point. The embodiment power-generating plants may produce power in the water turbine by harnessing the static pressure head generated from lifting the warm water droplets from the bottom of the vacuum chamber to the top of the vacuum chamber.

An embodiment power-generating plant may also include at least one sensor coupled to the platform, and a control system configured to process signals from the at least one sensor. In an embodiment, the at least one sensor may be configured to detect movement of the platform, and the control system may be configured to predict a position of the stop point for the mixed water jet based at least in part on the detected movement of the platform. In an embodiment, the control system may also be configured to send control signals to the at least one actuator.

An embodiment power-generating plant may also include a cold water duct that carries cold water from below the vacuum chamber to the cold water injection point, in which the cold water duct is a narrow cylinder positioned in the middle of the acceleration region of the vacuum chamber. In this embodiment, the mist generator may have an annular shape formed around the cold water duct at the bottom of the vacuum chamber.

In an embodiment, the cold water may be sprayed into each vacuum chamber in an outward circumferential manner forming an annulus of cold water, so that the circumference of the cold water annulus is maximized at the top of the vacuum chamber. In an embodiment, the water catchment system may include a catchment basin surrounding the top of the vacuum chamber. In another embodiment, the water catchment system may include a plurality of curved baffles configured to maximize the area of water collection at the stop point of the mixed water jet.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
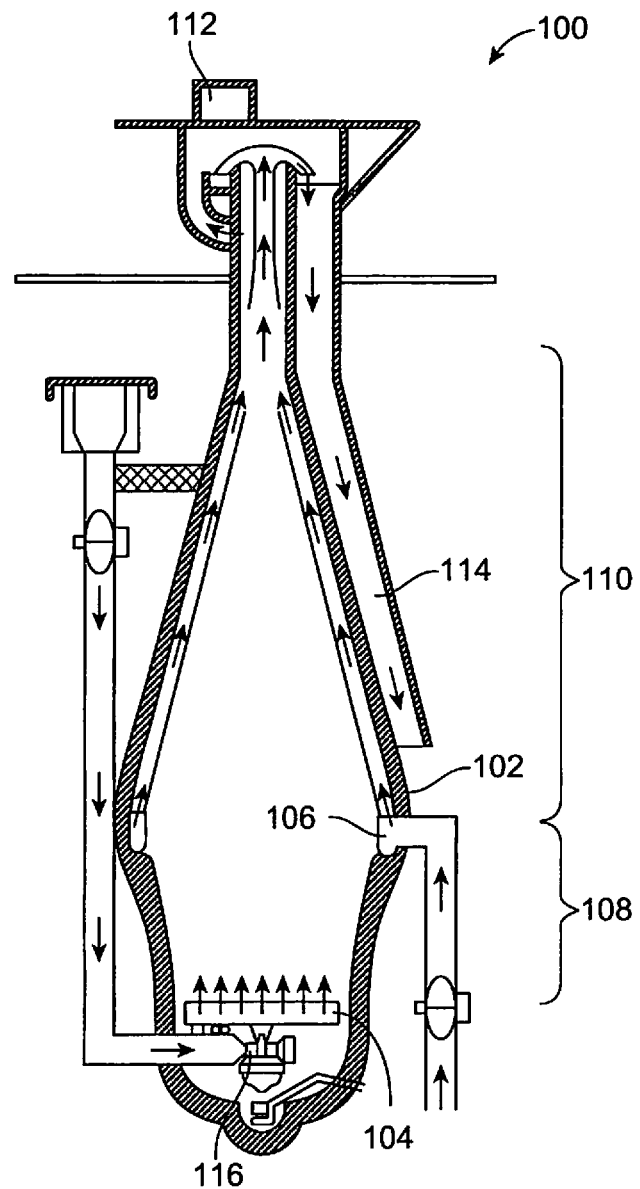
FIG. 1 is a cross-section view of a standard mist lift structure.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The various embodiments are described herein using example measurements and materials for components of embodiment mist lift systems and methods. However, the embodiments and the scope of the claims are not limited to such measurements or materials unless specifically recited.

The term "mist lift" refers generally to an open cycle OTEC system that uses pressure differences to lift water from the bottom of a chamber to the top. The terms "column", "cell", "chamber" and "cycle" are used herein to refer generally to any shape of structure to which the embodiments could be applied, and are not intended to limit the scope of the claims unless specifically recited.

The various embodiments provide systems, devices, and methods for generating power in a mist lift system. Using the mist lift concept and the constraints posed by real world implementation, the various embodiments provide a number of optimizations that yield a new power generating system.

The principles of operation for a general mist lift cycle are described in U.S. Pat. No. 4,216,657 and U.S. Pat. No. 4,441,321, and shown in an example illustrated in FIG. 1. In this example configuration, which produces 4 MW, a mist lift structure 100 has a total length of about 80 m. The mist lift structure 100 contains a vacuum chamber 102 in which a low pressure (e.g., around 2.4 kPa) is maintained. A mist generator 104, at the bottom of the vacuum chamber 102, may be a thin plate of corrosion resistant metal (stainless steel, titanium, etc.) that is perforated by a plurality of small holes. For example, the holes may be around 0.1 mm in diameter, and spaced, for example, around 2 mm apart from one another.

Warm seawater (e.g., at 30 m of head) may be introduced to the bottom of the mist lift generator 104, driven through the holes by the pressure difference across the mist generator plate. As a result, high-velocity droplets are emitted from the top of the mist lift generator 104. A small amount of the water droplets (e.g., around 10%) may evaporate because the low pressure in the vacuum chamber 102 is below the saturation pressure of the incoming warm seawater. Since the pressure (and therefore the density of the vapor) is low, the vapor is volumetrically much larger than the remaining liquid. This combination of water vapor and small seawater droplets results in a fine mist in the vacuum chamber 102, with the water droplets being sufficiently small such that they may be lifted by the moving water vapor.

At a cold water injection point 106, located higher on the mist structure 100 (e.g., about 20 m above the mist generator) cold seawater is sprayed into the vacuum chamber 102. The cold water condenses the water vapor at the injection point, thereby lowering pressure at this point (e.g., to about 1.2 kPa) As a result, a pressure differential is created along the vertical axis of the chamber between the mist generator 104 and the cold water injection point 106. The water vapor created at the mist generator 104 expands and accelerates towards the area of the cold water injection point 106, and can develop speeds up to 50 m/s. The length of the chamber 102 required for this acceleration process (i.e., the region between the mist generator 104 and the cold water injection point 106) is referred to herein as the "acceleration zone" 108. The momentum of the water vapor is sufficient to carry the seawater droplets up with the vapor. As the water vapor expands and rises, more water droplets evaporate due to the reducing pressure, which causes a cooling of the remaining droplets. The cooling and evaporation processes result in a net reduction in the enthalpy of the mist as heat energy in the water is converted into kinetic energy.

After passing through the acceleration zone 108, the mist has significant upward velocity, and coasts upward while decelerating due to gravity. As the mist rises, it comes into contact with the cold seawater injected at the cold water injection point 106. The vapor component of the mist condenses into the cold seawater and the liquid portion collides and merges with it, forming a mixed water jet. The length of the vacuum chamber required for this process (i.e., the region between the cold seawater injection points and the top of the chamber) is referred to herein as the "coast-and-condense region" 110. The collision of warm water droplets in the rising mist with the cold water impart the momentum required to carry the cold water to the top of the coast-and-condense region 110. The diameter of the vacuum chamber 102 decreases over the length of the coast-and-condense region 110, to corresponding to the decrease in specific volume of the mist as the water vapor component condenses.

Once the converged jet of combined seawater reaches the top of the coast-and-condense region 110, it is collected and removed from the vacuum chamber 102. The seawater drains back into the ocean under gravity through a separate duct 114A vacuum pump 112 removes non-condensables from the vacuum chamber 102.

Power is extracted from the seawater using a water turbine 116 positioned just below the inlet to the mist generator 104.

The mist generator is located at about 70 m below the sea level. Since the warm water entering the mist generator 104 is at 30 m of head, there is around 40 m more water head at the inlet of the water turbine than needed to drive the mist generator. This excess water head is removed by the turbine 116 to generate power.

The original concept of the mist lift cycle in the mist lift structure 100 assumed ideal conditions, and included no adjustment for dealing with the practical problems involved in installing a mist lift cycle plant at sea. An embodiment power-generating plant uses systems and methods that adjust for non-ideal conditions. In particular, the embodiments provide a mist lift plant system configured to be a dynamic floating offshore platform. In an embodiment plant, the platform includes cells that have mist lift columns housed therein. Further, the mist lift columns of the platform may themselves implement a variety of dynamic adjustments, which are described below with respect to FIGS. 3-6B.

Figure 2:
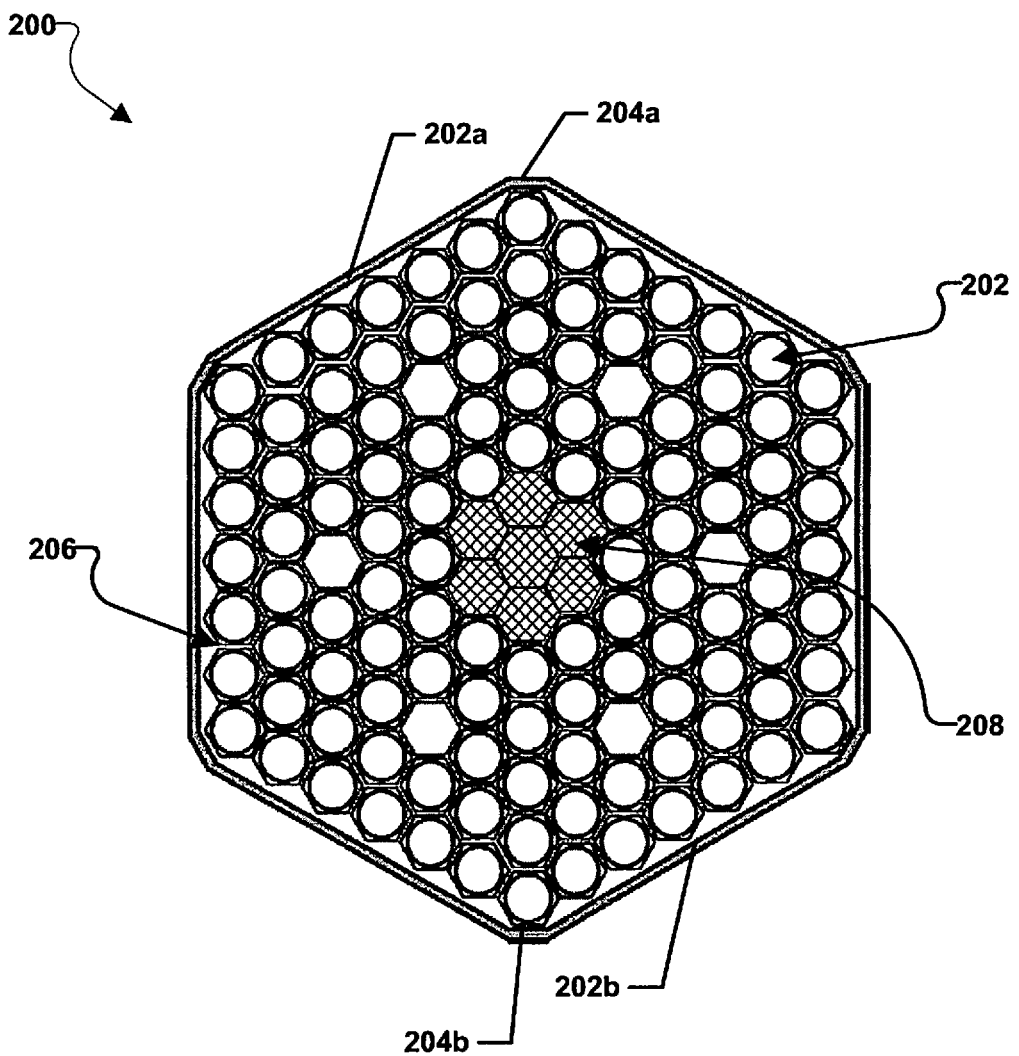
FIG. 2 is a top elevation view of a platform in a mist lift system according to an embodiment.

FIG. 2 illustrates the layout of a mist lift system platform according to an embodiment. The platform 200 may have a honeycomb configuration, and may be constructed using concrete and/or materials that are substantially made of the concrete. Steel is another suitable material that may be used to construct the floating platform, but other structural materials may also be used.

In an embodiment, the platform 200 may measure about 140 m across the flats (e.g., from side 202a to 202b) and about 156 m across the corners (e.g., from corner 204a to 204b). The platform 200 may have a total of 127 cells, with each cell having an interior that measures about 11.5 m across the flats and about 13.3 m across the corners. Several advantages may result from using a platform configured with a large number of small mist lift cells. Due to the economies of scale associated with building and operating energy generators, a viable plant will generally require a production capacity of at least 100 MW. As such, having a large overall mist lift system may be critical; however, since the vertical scale of the mist lift cycle (i.e., maximum height to which the mist can lift cold water) is dictated by the thermodynamics of the system, creating a single, large mist lift cycle may be infeasible. Further, an expansion of the diameter of a mist lift column would square the volume of the water vapor in the system, but would only double the surface area inside the column. Since condensation of the water vapor component of the mist is limited by the available interior surface area, a single, wide mist lift column may be inefficient. The use of a large platform with multiple smaller mist lift cells solves the scaling problems to provide a sufficient amount of power without disrupting the states and ratios that allow the mist lift system to operate efficiently.

The exterior walls 206 of the cells, forming the space between adjacent cells, may have a thickness of about 0.5 m. The draft of the structure (i.e., distance between the waterline and keel) may be, for example, about 20 m. These measurements are provided merely as examples, as the platform and cells are not limited to any specific dimensions.

The honeycomb configuration of the platform 200 may provide a number of advantages. For example, such designs make efficient use of materials by minimizing the amount of unusable enclosed volume. The uniform nature of the honeycomb configuration of platform 200 may provide equal pressure on each side of the exterior walls 206 of the cells 202 (with the exception of the walls on the perimeter of the platform 200). As such, the honeycomb shape may increase stability of the overall floating structure.

In an embodiment, the seven (7) center cells 208 of the platform 200 may be dedicated to a cold water pipe. Of the remaining 120 cells, 110 cells may each house a mist lift column (each mist lift cycle outputs 0.94 MW of power, therefore 110 mist lift cells are needed in order to generate 100 MW total). The remaining ten cells may each house a water turbine. In an embodiment, the water catchment system of each mist lift column may drain into one of these water turbine cells. Since there are 110 mist lift cycles and 10 turbines, groups of 11 mist lift columns may be made with all cells in each group sharing one of the 10 turbines. In an embodiment, all of the mist lift cells within a group may be connected to each other via their discharge water ducts (not shown).

Figure 3:
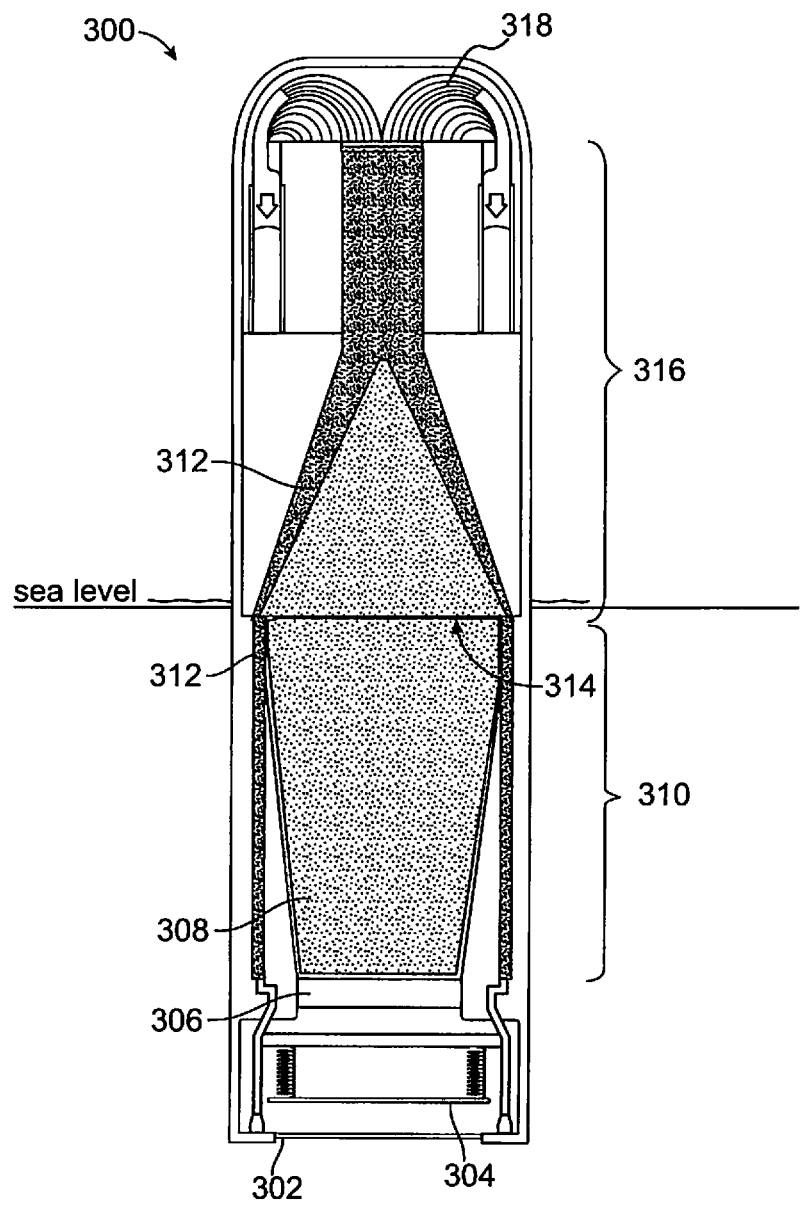
FIG. 3 is a cross-section view of a mist lift cell according to the various embodiments.

FIG. 3 illustrates the parts of an individual mist lift column 300 that may be housed in a cell 202 of the platform 200. An example mist lift column 300 may have a total height measuring about 40 m. Warm water (i.e., surface seawater) may be introduced to the mist lift column through an intake screen 302 in the bottom of a cell 202, which may constitute part of the keel of the platform 200. In an embodiment, the keel and intake screen 302 may be located 20 m below the ocean surface, providing a platform draft and intake depth for warm water of 20 m. An emergency seal plate 304 may be provided directly above the intake screen 302. The seal plate 304 may be mounted with springs and hydraulic rams such that any loss in hydraulic pressure (e.g., due to personnel action, power loss, or other emergency condition) may cause a seal to drop over the intake screen 302, thereby preventing the warm water from entering the space above it. In this manner, the seal plate 304 may function both as a control device capable of shutting down a mist lift cell and as a method of ensuring that cells do not flood.

A mist generator 306 may be provided above the emergency seal plate 302, which creates a fine warm water mist at the bottom of a vacuum chamber 308. In the various embodiments, an outer wall of the vacuum chamber 308 may be circular (i.e., such that a section parallel to the bottom of the chamber is a circle). In an embodiment, the first 20 m of the vacuum chamber 308 may be dedicated to the acceleration zone 310. The pressure at the top of the acceleration zone 310 is maintained lower than the pressure at the bottom, thereby accelerating the water vapor component of the mist. Although the vapor component is driven towards the top of the chamber, the warm water droplets suspended in the vapor stream resist the flow. The water vapor is forced to flow around the droplets and, in the process, lifts and carries the water droplets upward in the stream. As the vapor expands and rises, more water droplets evaporate as the pressure drops. To account for this increase in vapor volume, the outer wall of the vacuum chamber 308 may diverge (i.e., creating a larger circumference circle) toward the top of the acceleration zone 310.

At the top of the acceleration zone 310, cold water 312, carried up from below the mist lift cell 300, may be injected into the vacuum chamber 308 at a cold water injection point 314. In an embodiment, the cold water 312 may be provided to the mist lift cell 300 from a cold water pipe housed in the center cells 204, as described above with respect to FIG. 2. Distribution of the cold water to the mist lift cell 300 may be through pipes embedded in the concrete walls of the mist lift cell 300 and in the keel of the platform 200.

In an embodiment, the cold water injection point 314 may mark the height of one or more cold water nozzles into the vacuum chamber. Cold water 312 may be sprayed into the vacuum chamber 308, such as via the one or more nozzles, and may form a cold water annular sheet surrounding the mist. In an embodiment, generation of the cold water spray does not require use of any water pumps because of the pressure difference due to the pressure difference due to the momentum of the mist inside the vacuum chamber 308.

The remaining 20 m of the mist lift cell 300 above the acceleration zone 308 forms a coast-and-condense region 316. In the coast-and-condense region 316, the sprayed cold water 312 merges with the accelerated mist to form a mixed water jet that coasts upwards until gravity brings it to a stop at the stop point, after which the water falls through the catchment system 318. In an example embodiment, the first 13 m of the coast-and-condense region 316 may be the top part of the vacuum chamber 308, contained by the circular outer wall. The last 7 m of the coast-and-condense region 316 may be contained by walls of the water catchment system 318 that collects the water at or near the stop point of the mixed water jet.

In the various embodiments, the shape of the outer circular wall of the vacuum chamber 308 in the coast-and-condense region 316 may be cylindrical (i.e., providing no converging point), as compared to the conical shape of the coast-and-condense region 110 shown in FIG. 1 (i.e., converging to a point at the top). This cylindrical shape may provide more freedom for motion of the mist lift column 300, reducing the incidence of impact on the walls of the vacuum chamber 308 from the cold water jet. In particular, the shape of the coast-and-condense region 316 may maximize the amount of allowable platform pitch (e.g., due to wave action) before the rising water strikes the wall of the vacuum chamber. Further, the convergent shape of the actual path of the water in the coast-and-condense region 316 may be enforced by the injection geometry of the cold water spray.

Although the large design of the floating platform in the various embodiments may provide a great deal of stability to the mist lift plant, the plant may still be subject to movement disturbances. Any offshore platform may move in response to wind and waves, for example, causing changes in pitch and roll. As the platform tilts, the walls of the mist lift column may move relative to the rising water jet. Such movements, which may be short-term, can temporarily disrupt the mist lift process, since the top of the mixed water jet (i.e., the stop point at which the water should be collected) will have moved relative to the top of the mist lift column (i.e., the water catchment system).

Since platform motions cannot be economically eliminated, in the various embodiments, the water catchment system or the water stream itself may be configured to accommodate relative motions with respect to one another. Example mechanisms that may be used to provide such accommodation in a mist lift cell 300 are illustrated in FIGS. 4 and 5A-5C.

Figure 4A:
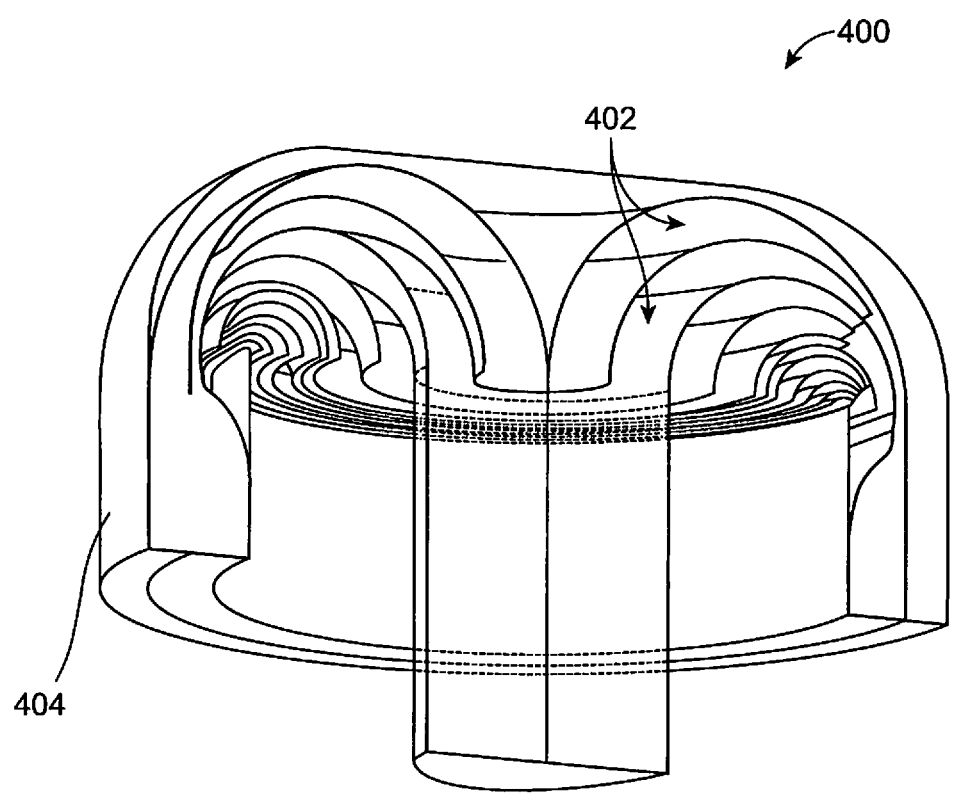
FIG. 4A is a cross-section view of a water catchment portion of a mist lift column according to an embodiment.
Figure 4B:
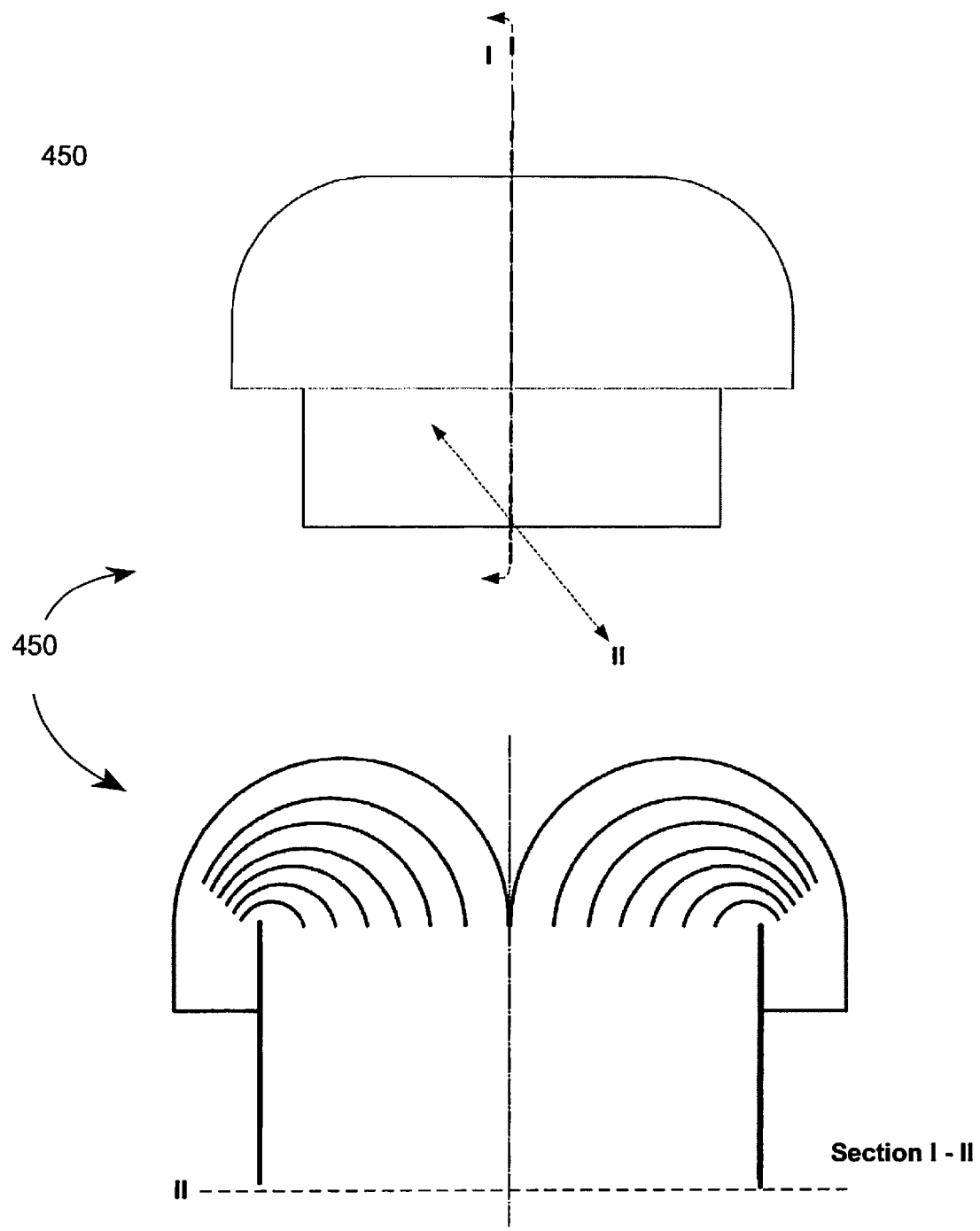
FIG. 4B is a side elevation view and cross-section view of a water catchment portion of a mist lift column according to an embodiment.

FIG. 4A illustrates a fixed vane water catchment system that utilizes a passive method for accommodating changes in water stream position due to pitch and roll. The fixed vane water catchment system 400 may be used with the embodiment mist lift columns, for example, in place of the water catchment system 318 shown in FIG. 3. The fixed vane water catchment system 400 may provide a complete ceiling in the mist lift column 300. An embodiment fixed vane water catchment system 400 may include a large number of baffles 402 configured so that, regardless of where the column hits the ceiling, the water will be directed into a catchment trough. In an embodiment, a water catchment trough 404 may have an annular shape around the top of the vacuum chamber. The radius of curvature of the baffles 402 may be set so that the acceleration of the water through the baffle is greater than the acceleration of gravity. In this manner, the system ensures that the collected water completes the turn rather than draining back into the vacuum chamber 308. FIG. 4B shows a cross-section I-II of an embodiment fixed vane water catchment system 450 showing the baffles or vanes in more detail.

An advantage that may be provided by the fixed vane water catchment 400 system is that it requires no moving parts for compensating for the wave-induced motions. A drawback to its use, however, may be that water entering the baffles requires a minimum velocity in order to complete the turn. The velocity is set by the highest elevation that the water must reach (i.e., inner baffles). Thus, the fixed vane water catchment must be installed low enough so that the rising water stream is captured before it reaches its peak elevation. Additionally, the catchment trough must be positioned low enough so that it is below the elevation of the lowest vanes. The distance between the lowest vanes and the highest vanes thus represents wasted potential energy.

Figure 5A:
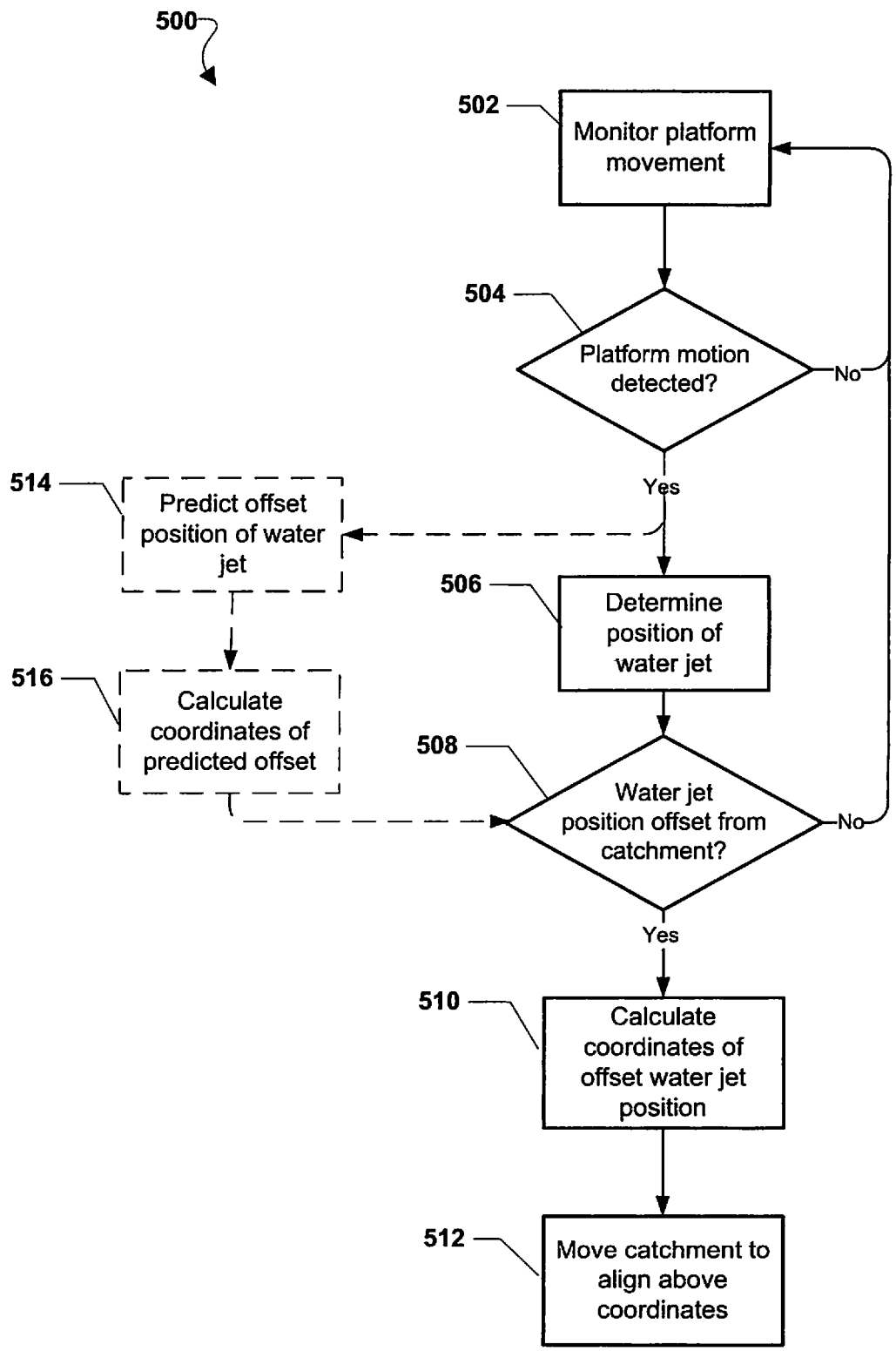
FIG. 5A is a process flow diagram illustrating a method of controlling performance of a mist flow column according to an embodiment.

FIG. 5A illustrates an embodiment method 500 for moving the catchment system to compensate for changes in water stream position in mist lift column 300 due to wave-induced motions. In this embodiment, the relative location of the rising mixed water jet in each mist lift column may be tracked. Specifically, in method 500, a control system may monitor the movement of the floating platform, step 502. In determination step 504, the system may determine whether motion of the platform is been detected. If there is no detected platform motion (i.e., determination step 504="No"), the method may return to step 502 to continue monitoring. If there is motion detected in the platform (i.e., determination step 504="Yes"), the position of the water jet relative to the walls and water catchment system of a mist lift column may be determined in step 506. In determination step 508, the system may determine whether the mixed water jet position is offset from the water catchment system. This determination may be performed using information gathered by any of a number of well known motion capture systems and methods. For example, motion detection sensors may include optical motion tracking sensors (e.g., using image sensors), inertial guidance systems (e.g., using gyroscopes), magnetic motion capture, RF positioning sensors, etc. Other suitable motion sensors may include, for example, acoustic sensors, infrared sensors, magnetometers, ultrasonic sensors, microwave radar sensors, inductive-loop detectors, triboelectric sensors, seismic sensors, inertia-switch sensors, etc.

If the mixed water jet position is not offset from the water catchment system (i.e., determination step 508="No"), the system may return to step 502 without initiating any change. If the water jet position is offset from the water catchment system (i.e., determination step 508="Yes"), the coordinates of the offset water jet position may be calculated in step 510. In step 512, the water catchment system may be moved to align directly above the coordinates of the offset mixed water jet position.

Further, method 500 may be augmented by predicting the expected water jet position based on mist lift column characteristics and platform motions. In optional step 514, the system may predict an offset position of the water jet in the mist lift column based on an expected effect of a detected platform motion. For example, in response to detecting a wave-induced motion of the platform at a certain angle, the system may predict a resulting movement of a mist lift column based on the measurements of the wave-induced motion, the position of the mist lift column within the platform, previously gathered data, etc. In optional step 516, the system may calculate coordinates of the predicted offset mixed water jet position, and may proceed to step 512 to move the catchment accordingly.

Movement of the water catchment system may be performed, for example, by using any of a number of well-known actuators. Examples of suitable actuators may include, but are not limited to, hydraulic cylinders, pneumatic actuators, linear actuators, piezoelectric actuators, thermal bimorphs, electric motors, etc.

One advantage of method 500 may that it reduces the energy losses in comparison to the fixed vane water catchment system in FIG. 4. The vanes in the water catchment system may be tuned more efficiently because the mixed water jet may impact them at the same point at all times, allowing the vanes to be set higher in the column when possible. In this manner, the height of the catchment trough may be increased, and more power produced as a result. One potential disadvantage to using method 500 may be its complexity, since it may involve synchronizing separate tracking and maneuvering systems for the water catchment system to be placed correctly. Failure to position the water catchment system correctly may cause some of the mixed water jet to fall back through the mist lift column, with the fallen water representing lost energy.

In addition to the wave-induced changes in pitch and roll, depending on specific plant design, accommodations may also be made in the water catchment system for changes in surface seawater temperature, such as by movement along the vertical axis of the mist lift cell. The change in surface seawater temperature may affect, for example, temperature of the warm surface seawater water that may be provided to a mist lift cell through the intake screen 302, described above with respect to FIG. 3. Temperature of surface seawater may vary, for example, according to the season, which may result in varying output of the mist lift plant at different times during the year.

When surface water temperatures change, the work output of the mist lift plant changes, which may be manifested in the elevation of the lifted water. In the summer, when water is the warmest, output may increase due to even larger resulting pressure differential between the warm mist and the cold water injection in a mist lift column. Conversely, during the winter when the water is coolest, output decreases because there is a smaller differential between the warm water vapor mist and the cold water injection in a mist lift column. Therefore, in the various embodiments, a water catchment system may be moved lower during the winter than during the summer. Since the variations are extremely slow, meaning that changes in elevation may be required infrequently and in small increments, such elevation changes may be performed using well known, standard hydraulic rams connected to a control system.

Figure 5B:
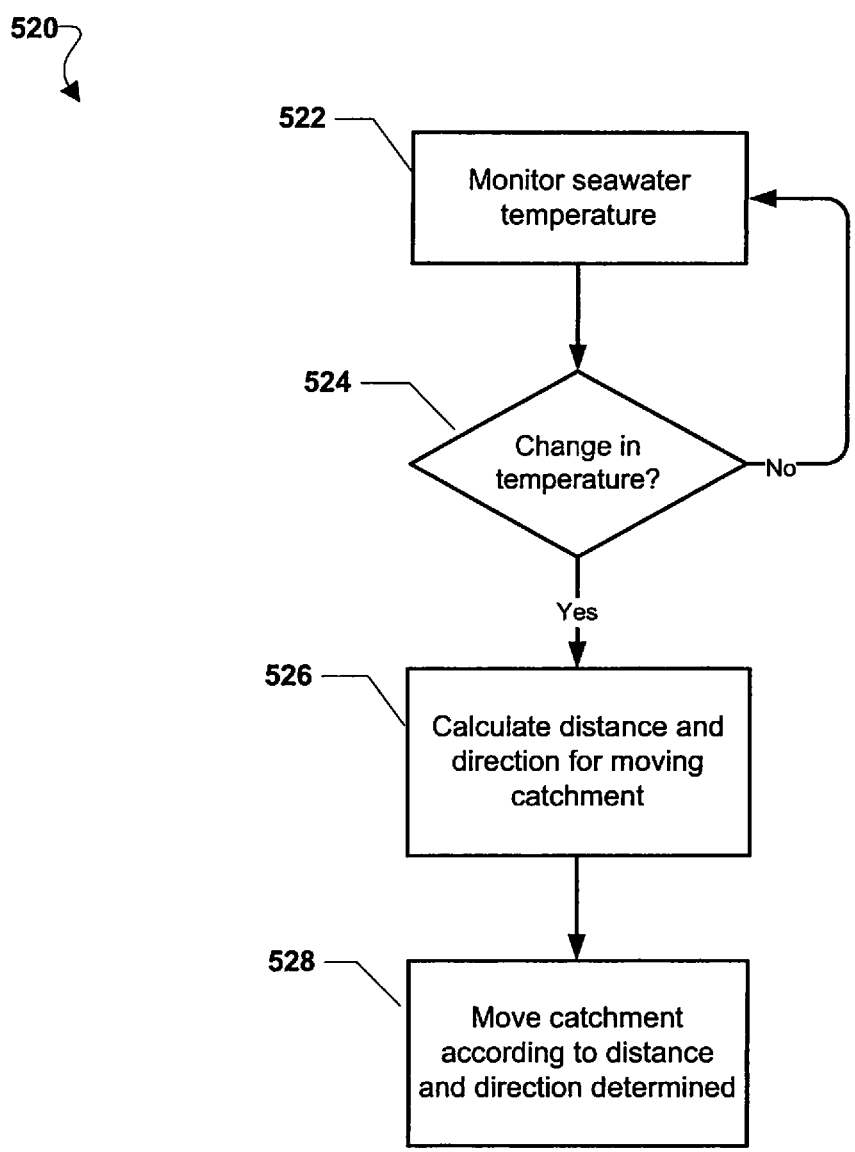
FIG. 5B is a process flow diagram illustrating a method of controlling performance of a mist flow column according to another embodiment.

FIG. 5B illustrates an embodiment method 520 for adjusting for changes in water lift due to changes in surface seawater temperature. In step 522 of method 520, a control system may monitor temperature of the seawater by receiving input from temperature sensors. In step 524, the system may determine whether there is a change in temperature (for example, a change that exceeds a threshold such as one degree). In step 524, if it is determined that there is no change in temperature (i.e., determination step 524="No"), the method may return to step 522. If it is determined that there is a change in surface seawater temperature (i.e., determination step 524="Yes"), the system may determine a distance and direction (i.e., up or down) in which to move the catchment system based on the difference between the previous temperature and the new temperature in step 526. In step 528, the system may activate a mechanism that raises or lowers the catchment system accordingly. The mechanism may be, for example, a hydraulic ram or other actuator as described above with respect to FIG. 5A.

Instead of, or in addition to, changing the position of the water catchment system to accommodate for wave-induced platform motion, in another embodiment, the position of the water jet may be moved relative to the water catchment system. For example, by varying injection pressure of the cold water, and the aperture size of the cold water injection nozzles, the pressure at which cold water is injected into the vacuum chamber may be changed without altering the cold water mass flow rate. Such a change in pressure may alter the velocity at which cold water enters the chamber (i.e., increased pressure will result in increased velocity, and decreased pressure will result in decreased velocity). By changing the cold water velocity, while maintaining constant cold water flow, the momentum of the cold water jet may be changed while its cooling capacity is held constant. If the cold water momentum is changed in one section of the chamber, then the net radial momentum will no longer be zero and the rising cold water jet will be deflected. In the various embodiments, the injection pressure of the cold water may be changed using, for example, pumps or control valves coupled to the cold water injection nozzles.

Figure 5C:
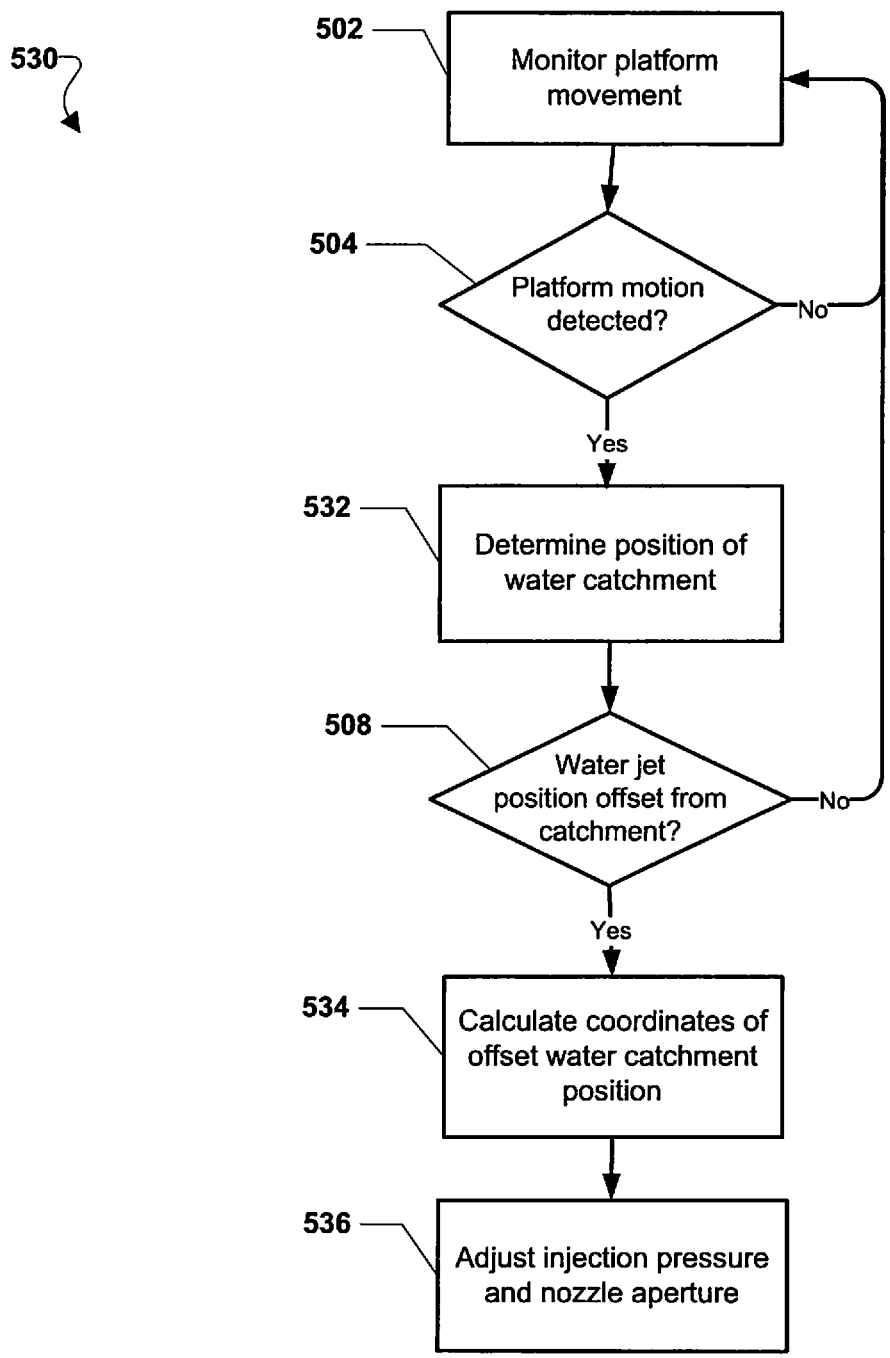
FIG. 5C is a process flow diagram illustrating a method of controlling performance of a mist flow column according to another embodiment.

FIG. 5C illustrates an embodiment method 530 in which water jet placement may be changed through controlling the velocity of the injected cold water. In method 530, a control system may monitor the movement of the floating platform, step 502. In determination step 504, the system may determine whether motion of the platform is detected. If there is no detected platform motion (i.e., determination step 504="No"), the system may return to step 502 to continue monitoring. If there is motion detected in the platform (i.e., determination step 504="Yes"), the position of the water catchment system relative to the water jet in a mist lift column may be determined in step 532. In determination step 508, the system may determine whether the water catchment system position is offset from the water jet. This determination may be performed using information gathered by any of a number of motion capture systems and methods that are well known in various fields. Such systems and methods may include, but are not limited to, optical motion tracking (e.g., using image sensors), inertial guidance systems (e.g., using gyroscopes), magnetic motion capture, RF positioning, etc. If the system determines that the water catchment system is not offset (i.e., determination step 508="No"), the system may return to step 502 without initiating any change. If the system determines that the water catchment system position is offset from the water jet (i.e., determination step 508="Yes"), the coordinates of the offset water catchment position may be calculated by the system in step 534. In step 536, the system may adjust the pressure of the injected cold water and the aperture on one or more of the cold water injection nozzles to cause the mixed water jet to reach the offset water catchment position. For example, if the injection velocity on one side of the vacuum chamber is increased, the net radial momentum vector will point away from that side, and the jet will be deflected away. Conversely, if the injection velocity on one side is reduced, the net radial momentum vector will point towards that side, and the jet will be drawn in. In another example, moving the position of the water jet relative to the water catchment system may be performed by adjusting the angles of the cold water injection nozzles in one section of the chamber to deflect the rising cold water jet. This may be accomplished by actuators that are coupled to the cold water injection nozzles and that are controlled by the control system. In this embodiment, changes in nozzle angle may be determined as part of step 534 and movement of the nozzles or actuator movements affected in step 536. Movement of the cold water injection nozzles may be in addition to or instead of movement of the water catchment system.

In another embodiment, instead of, or in addition to, changing the position of the water catchment system to accommodate for changes in the surface seawater temperature as described above with respect to FIG. 5B, the velocity of the cold water jet may be changed to make these accommodations. For example, the cold water velocity may be changed by varying the pressure of the injected cold water and the aperture size of the cold water injection nozzles. If the cold water momentum is changed symmetrically around the chamber, rather than in one section, then the momentum of the rising cold water jet may be increased (such as during the winter) or decreased (such as during the summer). This embodiment may therefore avoid wasted energy in the fixed vane water catchment system described above with respect to FIG. 4, yet does not require a catchment system with moving parts.

Figure 5D:
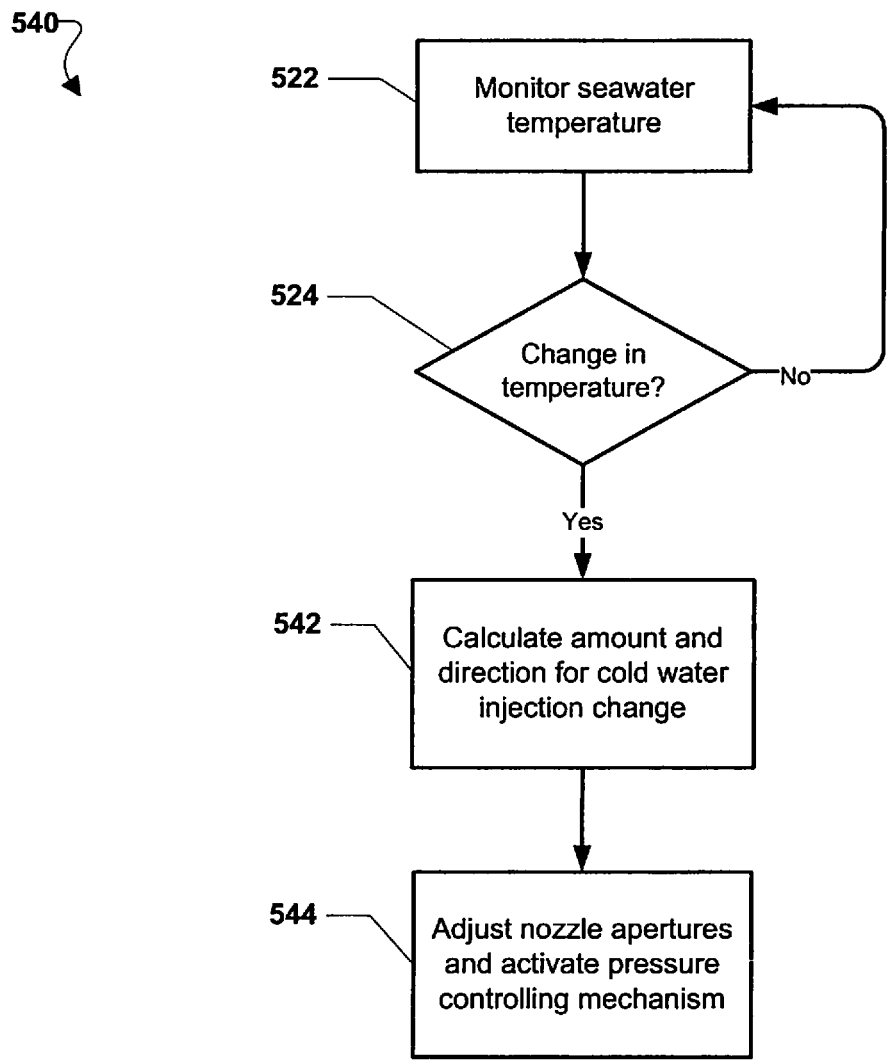
FIG. 5D is a process flow diagram illustrating a method of controlling performance of a mist flow column according to another embodiment.

FIG. 5D illustrates an embodiment method 540 in which the water jet height may be changed through controlling the velocity of the injected cold water. In step 522, a control system may monitor temperature of the seawater by receiving input from temperature sensors. In step 524, the control system may determine whether there is a change in temperature (for example, a change that exceeds a threshold such as one degree). If the control system determines that there is no change in temperature (i.e., determination step 524="No"), the control system may continue to monitor the surface seawater temperature by returning to step 522. If the control system determines that there is a change in surface seawater temperature (i.e., determination step 524="Yes"), the control system may calculate the amount and direction (i.e., up or down) of change required in the cold water injection spray based on the difference between the previous temperature and the new temperature in step 542. In step 544 the control system may adjust the cold water injection nozzle apertures and activate a pressure controlling mechanism (e.g., pump, control valve, etc.) for the injected cold water spray to accomplished the calculated change.

As shown in the mist lift cell 300, described above with respect to FIG. 3, the injected cold water in some embodiments may surround a conical mist flow, thereby forming an annular cold water sheet. The cold water is therefore forced to converge at the center of the vacuum chamber, where all radial velocity components cancel to zero.

Figure 6A:
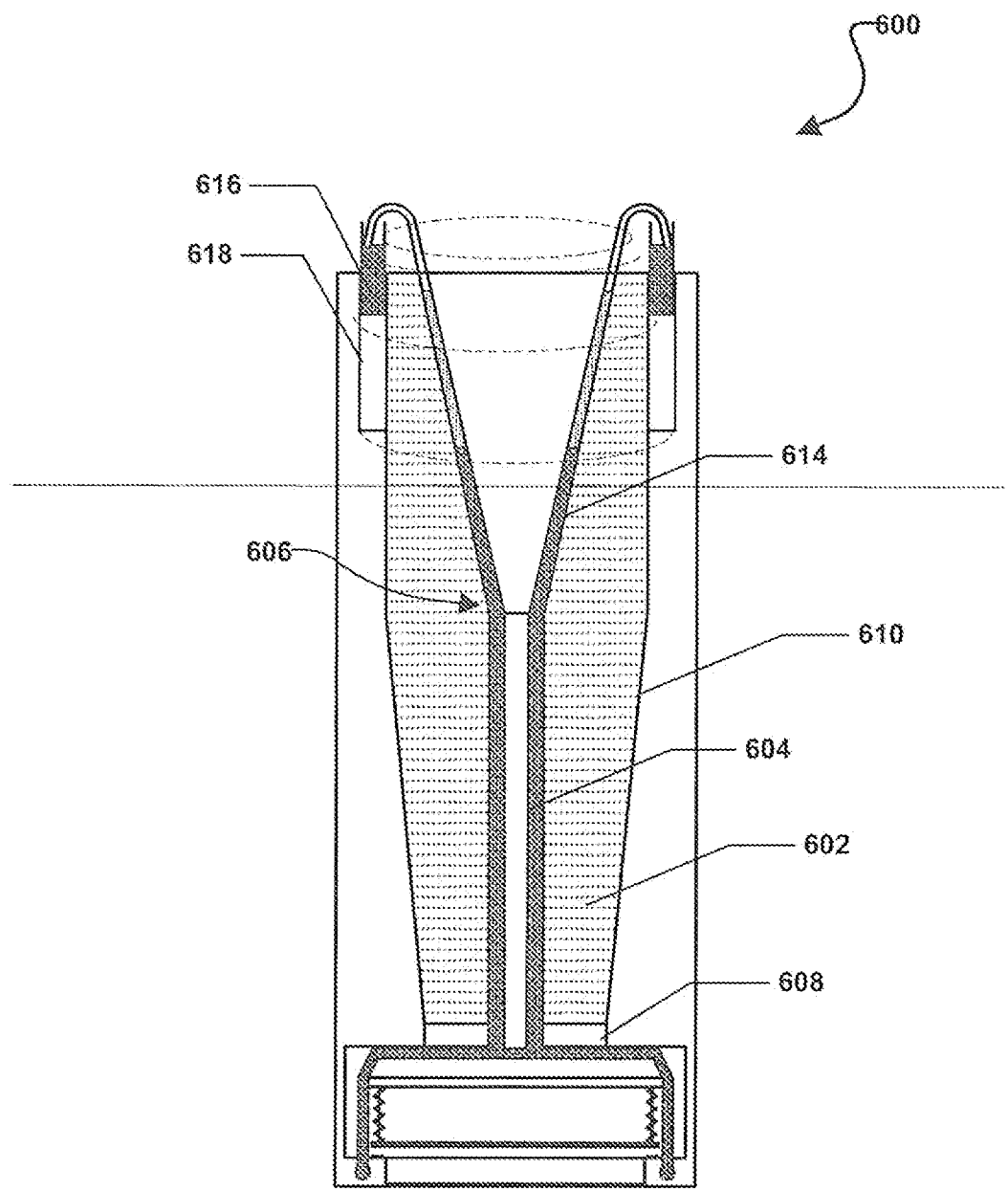
FIG. 6A is a cross-section view of a mist lift cell according to another embodiment.

FIG. 6A illustrates an alternative embodiment of a cold water spray configuration. In this embodiment of the mist lift column 600, an annular mist flow 602 may surround a cold water injection spray, thereby directing the radial momentum of the cold injected cold water outwards instead of inwards. A narrow cylinder may form a cold water duct 604 that brings the cold water up to the injection level point 606. The mist generator 608 may be an annular plate that fits between the cold water duct 604 and the outer walls 610 of the vacuum chamber 612. The outer walls 610 of the vacuum chamber may diverge to provide space for mist expansion, similar to the mist lift column in FIG. 3. At the top of the cold water duct 604, nozzles may direct the cold water flow upwards and outwards in an expanding annulus 614. The expansion angle may be set such that the space available for the warm water mist decreases as the water moves upwards, mimicking the effect of a converging cold water spray into a mixed water jet.

The residual outward momentum of the rising mixed water jet may carry the water over a retaining wall 616 and into a catchment basin 618. In this embodiment, only a minimal catchment system may be required to compensate for vessel motions because momentum will carry the water along the correct path. Further, the expanding annulus may provide a heat transfer area 614 available for condensation which increases as the cold water spray moves upward. The added area compensates for the fact that the cold water is warming as it travels.

Figure 6B:
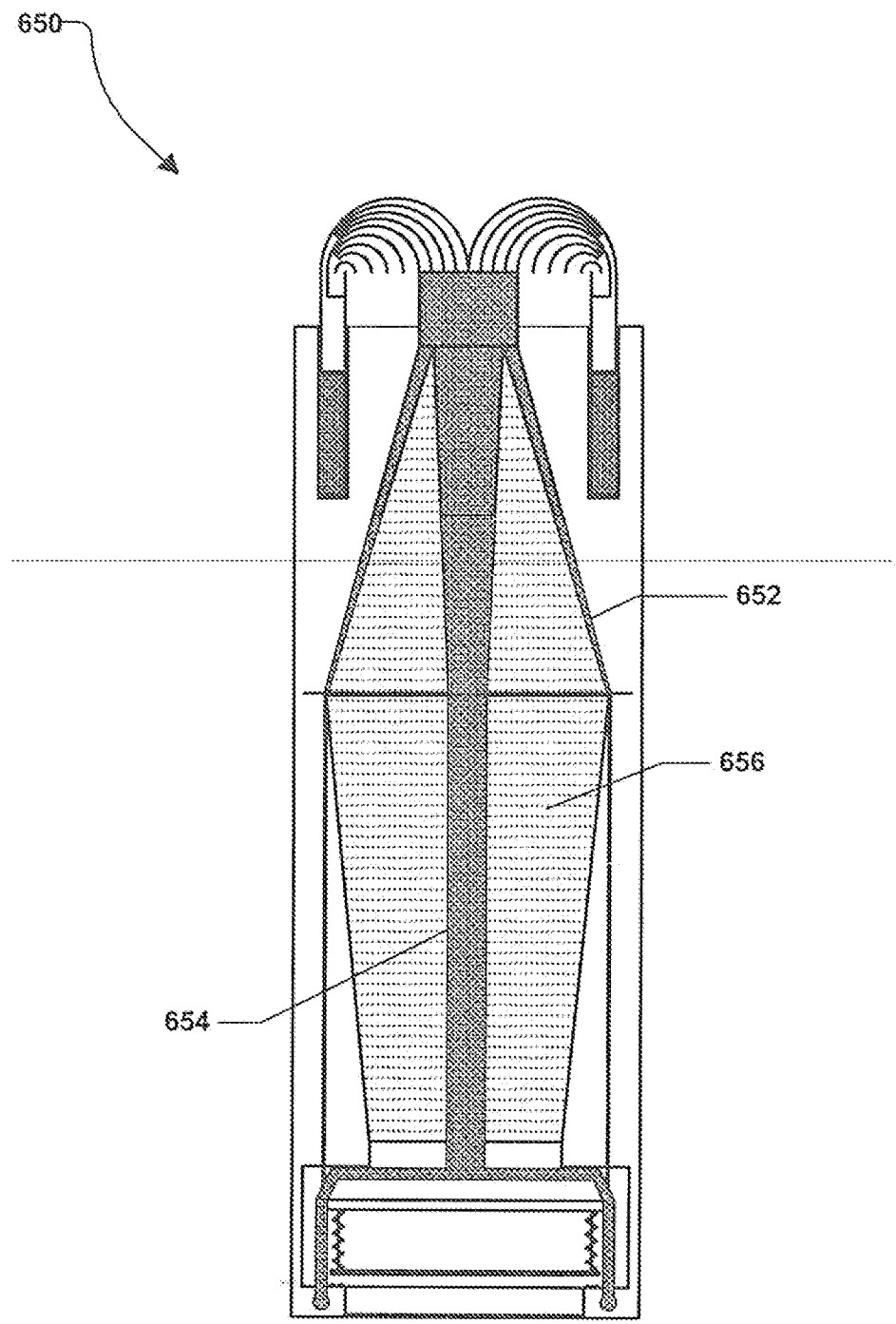
FIG. 6B is a cross-section view of a mist lift cell according to another embodiment.

FIG. 6B illustrates an alternative embodiment of a cold water spray configuration. In this embodiment of the mist lift column 650, a first cold water injection spray may form an annular cold water sheet 652, as described above with respect to FIG. 3, and a second cold water injection spray may be provided by a cold water duct 654 surrounded by an annular mist flow 656, as described above with respect to FIG. 6A. The use of multiple cold water sprays in this embodiment may provide an even larger heat transfer area. In the various embodiments, the mist lift columns 600, 650 may also be configured to adjust for wave-induced platform motions and/or changes in temperature of the surface seawater using any of the methods described above with respect to FIGS. 5A-5D.

Figure 7:
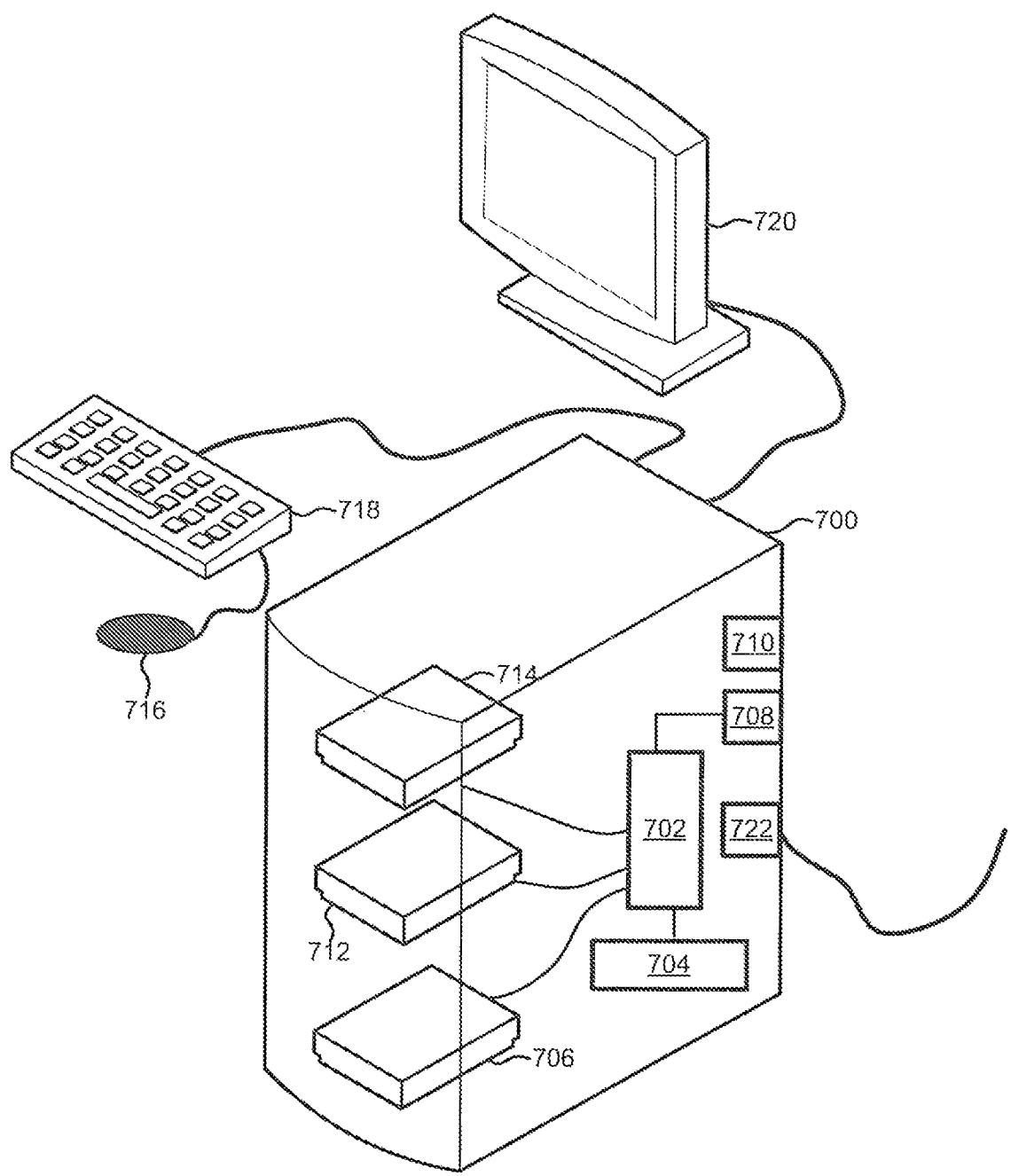
FIG. 7 is a component block diagram illustrating an example control system for controlling performance of a mist lift system according to an embodiment.

A control system to direct adjustments of a water catchment system and/or cold water spray in response to movement or temperature change may be any of a variety of computing devices, such as a workstation computer 700 illustrated in FIG. 7. Such a workstation computer 700 may include a processor 702 coupled to volatile memory 704 and a large capacity nonvolatile memory, such as a disk drive 706. The computer 700 may also include sensor processing circuitry 708 coupled to the processor 702, which may be configured to receive input from a sensor (i.e., a motion sensor to track platform movement, a temperature sensor to track temperature changes, etc.). The processor 702 may also be coupled to actuator circuitry 710 that is configured to receive control signals from the processor 704 and to activate one or more actuators suitable to move the water catchment system. The computer 700 may also include a floppy disc drive 712 and a compact disc (CD) drive 714 coupled to the processor 700. The computer 700 may also include a pointing device such as a computer mouse 716, a user input device such as a keyboard 718, and a display 720. The control system 700 may also include a number of connector ports 722 coupled to the processor 700 for connecting the processor to a network.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the control system embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the control system embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a computer-readable medium. The steps of a method or algorithm disclosed herein may be embodied in a processor-executable software module which may reside on a tangible, non-transitory computer-readable storage medium. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory machine readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A power-generating plant, comprising:
a floating off-shore platform comprising a plurality of cells;
one or more water turbines housed in one or more of the plurality of cells;
one or more cold water pipes housed in one or more of the plurality of cells; and
one or more vacuum chambers housed in one or more of the plurality of cells, wherein each of the one or more vacuum chambers is partially submerged below sea level, maintained at a pressure lower than pressure of surrounding seawater, and comprises:
an intake screen positioned at the bottom of the vacuum chamber and configured to permit warm seawater to enter the vacuum chamber;
a mist generator positioned above the intake screen and configured to cause the warm seawater to form a mist comprising warm water droplets and water vapor;
at least one cold water injection nozzle configured to spray cold water into the vacuum chamber at a cold water injection point;
an acceleration region positioned between the mist generator and the cold water injection point, and configured to cause water vapor lifts the warm water droplets and accelerates upward toward the cold water injection point;
a condensing region positioned between the cold water injection point and the top of the vacuum chamber, and configured so that the cold water sprays the accelerated mist to form a mixed water jet within the condensing region;
a water catchment system configured to collect the water from the water jet, wherein the catchment system is configured with baffles positioned at an elevation within the vacuum chamber close to a maximum height achieved by the mixed water jet; and
one or more water turbine configured to produce power by harnessing static pressure head generated from the lifting the warm water droplets from the bottom of the vacuum chamber to the top of the vacuum chamber.

2. The power-generating plant of claim 1, wherein the plurality of cells comprises one-hundred and twenty-seven cells positioned within a honey-comb configuration, wherein:
ten of the one-hundred and twenty-seven cells each contain a water turbine;
one-hundred and ten of the one-hundred and twenty-seven cells each contain a vacuum chamber; and
seven of the one-hundred and twenty-seven cells contain a cold water pipe, wherein the seven cells are located at a center of the plurality of cells.

3. The power-generating plant of claim 1, wherein the platform comprises a substantially concrete platform.

4. The power-generating plant of claim 1, wherein the plant is configured to generate 100 MW of power.

5. The power-generating plant of claim 1, further comprising:
at least one sensor coupled to the platform; and
a control system configured to process signals from the at least one sensor.

6. The power-generating plant of claim 5, further comprising:
at least one actuator,
wherein the control system is further configured to send control signals to the at least one actuator based on the processed input.

7. The power-generating plant of claim 6, wherein:
the at least one sensor is configured to detect movement of the platform; and
wherein the control system is further configured to send control signals such that the control signals cause the at least one actuator to adjust a position of the water catchment system in response to the detected movement of the platform.

8. The power-generating plant of claim 6, wherein:
the at least one sensor is configured to detect a temperature change in surface seawater surrounding the platform; and
wherein the control system is further configured to send control signals such that the control signals cause the at least one actuator to raise or lower the catchment system in response to the detected temperature change.

9. The power-generating plant of claim 6, wherein:
the at least one sensor is configured to detect movement of the platform; and
the control system is further configured to:
predict a maximum height achieved by the mixed water jet based at least in part on a detected movement of the platform; and
send control signals to the at least one actuator based on the predicted maximum height achieved by the mixed water jet.

10. The power-generating plant of claim 1, further comprising:
at least one sensor configured to detect movement of the platform; and
a control system configured to:
process input received from the at least one sensor; and
change a velocity of the cold water spray into the vacuum chamber in response to the processed input in order to adjust the maximum height achieved by the mixed water jet.

11. The power-generating plant of claim 10, wherein:
the at least one cold water injection nozzle is configured with an adjustable aperture and coupled to a pressure control mechanism; and
the control system is configured such that changing the velocity of the cold water spray comprises:
sending control signals to the adjustable aperture that cause expansion or contraction of the adjustable aperture; and
sending control signals to the pressure control mechanism that cause an increase or decrease in pressure of the cold water spray.

12. The power-generating plant of claim 10, wherein the pressure control mechanism comprises a control valve.

13. The power-generating plant of claim 10, wherein the pressure control mechanism comprises a pump.

14. The power-generating plant of claim 1, further comprising:
a cold water duct configured to carry cold water from below the vacuum chamber to the cold water injection point, wherein:
the cold water duct comprises a narrow cylinder positioned in the middle of the acceleration region of the vacuum chamber; and
the mist generator is configured in an annular shape around the cold water duct at the bottom of the vacuum chamber.

15. The power-generating plant of claim 14, wherein the cold water spray forms an annulus of cold water within the vacuum chamber, wherein circumference of the cold water spray increases as elevation increases.

16. The power-generating plant of claim 14, wherein the cold water spray comprises a first portion and a second portion, wherein:
the first portion comprises a cold water annulus in the center of the vacuum chamber; and
the second portion comprises a cold water annulus surrounding the accelerated mist.

17. The power-generating plant of claim 15, wherein the catchment system comprises a catchment basin surrounding the top of the vacuum chamber.

18. The power-generating plant of claim 1, wherein the cold water spray forms an annulus of cold water surrounding the mist within the vacuum chamber, the circumference of which decreases as elevation increases.

19. The power-generating plant of claim 1, wherein the water catchment system comprises a plurality of curved baffles configured to maximize an area of water collection at the maximum height achieved by the mixed water jet.

20. The power-generating plant of claim 1, wherein circumference of the condensing region decreases as elevation increases.

21. The power-generating plant of claim 1, wherein the distance from the bottom of the vacuum chamber to the top of the catchment system measures 40 m.

22. The power-generating plant of claim 21, wherein the acceleration zone measures 20 m.

23. The power-generating plant of claim 21, wherein the cold water injection point is positioned approximately at sea level.

24. A method for compensating for the effects of wave-induced motions in a vacuum chamber of a mist lift system platform, comprising:
detecting motion of the mist lift system platform;
determining a water stream position in the vacuum chamber in response to detecting motion of the mist lift system platform;
determining whether the determined water stream position is offset from a water catchment coupled to the vacuum chamber;
calculating coordinates of an offset water stream position in response to determining that the determined water stream position is offset from the water catchment; and
moving the water catchment to a position that is aligned above the calculated coordinates.

25. The method of claim 24, wherein determining a water stream position in the vacuum chamber in response to detecting motion of the mist lift system platform comprising predicting the offset water stream position based at least in part on the detected motion of the mist lift system platform.

26. A method for compensating for the effects of changes in surrounding seawater temperature in a vacuum chamber of a mist lift system platform, comprising:
monitoring temperature of the surrounding seawater;
determining whether the temperature of the surrounding seawater has changed;
calculating a distance and a direction for moving a catchment system coupled to the vacuum chamber in response to determining that the temperature of the surrounding seawater has changed; and
moving the catchment system according to the calculated distance and direction.

27. A method for compensating for the effects of wave-induced motions in a vacuum chamber of a mist lift system platform, comprising:
detecting motion of the mist lift system platform;
determining a position of a water catchment coupled to the vacuum chamber;
determining whether a position of a water stream in the vacuum chamber is offset from the water catchment;
calculating coordinates of an offset water catchment position in response to determining that the position of the water stream is offset from the water catchment;

adjusting pressure of cold water injected into the vacuum chamber by one or more cold water injection nozzle in response to the calculated coordinates; and adjusting an aperture on the one or more cold water injection nozzle in the vacuum chamber in response to the calculated coordinates.

28. A mist lift power-generating plant, comprising:

a control system configured to monitor sensors and issue control signals in response to sensor data; and a water catchment system within a vacuum chamber configured to be adjusted in position along at least a vertical dimension of the vacuum chamber in response to control signals received from the control system.

29. The mist lift power-generating plant of claim 28, wherein the water catchment system is configured to be adjusted in position along a horizontal dimension of the vacuum chamber.

30. The mist lift power-generating plant of claim 28, wherein the sensors monitored by the control system include at least one of a roll or pitch sensor and a temperature sensor.

* * * * *